United States Patent [19]

Ogata et al.

[11] Patent Number: 5,109,110
[45] Date of Patent: Apr. 28, 1992

[54] PROCESS FOR THE PRODUCTION OF POLYARYLENE SULFIDES WITH LITHIUM HALIDE AND ALKALI METAL HYDRO SULFIDE

[75] Inventors: Norio Ogata; Minoru Senga, both of Chiba, Japan

[73] Assignee: Idemitsu Petrochemical Company Limited, Tokyo, Japan

[21] Appl. No.: 364,410

[22] Filed: Jun. 12, 1989

[30] Foreign Application Priority Data

Jun. 13, 1988 [JP] Japan .................. 63-146651
Oct. 17, 1988 [JP] Japan .................. 63-260996

[51] Int. Cl.⁵ ............................................. C08G 75/16
[52] U.S. Cl. ...................................... 528/388; 528/86; 528/271; 528/364
[58] Field of Search ................. 528/388, 86, 271, 364

[56] References Cited

U.S. PATENT DOCUMENTS

| | | | |
|---|---|---|---|
| 3,354,129 | 11/1967 | Edmonds, Jr. | 260/79 |
| 3,869,433 | 3/1975 | Campbell | 260/79.1 |
| 3,876,591 | 4/1975 | Campbell | 260/79.1 |
| 3,889,433 | 7/1975 | Eubank, Jr. | 52/86 |
| 4,025,496 | 5/1977 | Anderson et al. | 260/79.1 |
| 4,038,263 | 7/1977 | Edmonds, Jr. | 260/79.1 |
| 4,038,266 | 7/1977 | Marchant et al. | 260/152 |
| 4,039,518 | 8/1977 | Campbell | 260/79.1 |
| 4,071,509 | 1/1978 | Edmonds, Jr. | 260/79 |
| 4,373,091 | 2/1983 | Edmonds, Jr. | 528/481 |
| 4,810,773 | 3/1989 | Ogata et al. | 528/388 |
| 4,837,301 | 6/1989 | Glock et al. | 528/388 |

FOREIGN PATENT DOCUMENTS

| | | |
|---|---|---|
| 0073525 | 1/1982 | European Pat. Off. |
| 0215312 | 8/1986 | European Pat. Off. |
| 0296250 | 12/1987 | European Pat. Off. |
| 0321881 | 12/1988 | European Pat. Off. |
| 45-3368 | 2/1970 | Japan |
| 50-53213 | 3/1982 | Japan |

*Primary Examiner*—Harold D. Anderson
*Attorney, Agent, or Firm*—Nikaido, Marmelstein, Murray & Oram

[57] ABSTRACT

Polyarylene sulfides are produced by polymerizing a dihalogen aromatic compound with an alkali metal hydrosulfide in the presence of a lithium halide in an organic polar solvent. In this polymerization, an alkali metal hydroxide and/or carbonate is added and a branching agent such as a trihalogen aromatic compound or a halogen aromatic nitro compound is used, if desired.

The polyarylene sulfides have a high molecular weight and a less salt contents and a high degree of whiteness.

6 Claims, No Drawings

1

PROCESS FOR THE PRODUCTION OF POLYARYLENE SULFIDES WITH LITHIUM HALIDE AND ALKALI METAL HYDRO SULFIDE

BACKGROUND OF THE INVENTION

1. Field of the Invention

The present invention relates to a process for the production of polyarylene sulfides and, more particularly, to a process for the production of polyarylene sulfides in high yields and with high efficiency, which have high molecular weights and contain salt residues in less amounts.

2. Description of Related Art

Polyarylene sulfides such as polyphenylene sulfide and the like are thermoplastic resins in which a portion of their molecules is to be thermoset and which possess excellent characteristics as engineering plastics such as chemical resistance as well as mechanical properties and thermally resistant rigidity in a wide range of temperatures.

U.S. Pat. No. 3,354,129 and Japanese Patent Publication No. 3,368/1970 disclose processes for preparing polyarylene sulfides such as polyphenylene sulfide from an alkali metal sulfide and a polyhalide of an aromatic compound. The processes, however, suffer disadvantages that a yield in the polyarylene sulfides is decreased and a solvent used is lost on account of decomposition of the alkali metal sulfide upon removal of hydrated water of the alkali metal sulfide.

Accordingly, in order to solve these disadvantages, there have been proposed improved methods using an alkali metal hydrosulfide which is readily handled during dehydration operation.

For example, U.S. Pat. No. 3,876,591 discloses a process in which an alkali metal hydrosulfide is used at a rate from 0.8 to 1.5 times as much as a polyhalogen aromatic compound. Examples shown in this patent publication, however, provide polyarylene sulfides which are small in molecular weight and have a maximum inherent viscosity ($\eta_{inh}$) of 0.04 at the highest and a melting point of 260° C. or lower. Furthermore, U.S. Pat. No. 3,889,433 discloses a process in which an alkaline earth metal hydroxide or an alkali metal carbonate is added. Examples of this patent publication give only polyarylene sulfides with low molecular weights, which have a inherent viscosity ($\eta_{inh}$) of 0.06 or lower and a melting point of 263° C. or lower. It is to be noted that these polyarylene sulfides are said to be inappropriate as engineering materials.

As an improvement in the processes as have been described hereinabove, Japanese Patent Publication No. 14,698/1982 proposes a process in which an alkali metal hydrosulfide and an alkali metal hydroxide are used in particular conditions. This process provides only polyarylene sulfides with a viscosity as low as about 80 to 83 poises, however, such low viscosity polyarylene sulfides are not suited for uses such as films, fibers and the like. Furthermore, although this patent publication fails to state in an expressed manner, the resulting reaction products are subjected to conventional post-processing so that it is presumed that an ash remains in the reaction products in a content as high as approximately 500 to 6,000 ppm as disclosed in U.S. Pat. Nos. 4,025,496 and 4,373,091. For instance, U.S. Pat. No. 4,025,496 discloses a process in which the order of adding an alkali metal hydroxide is specified to provide polyarylene sulfides which can be readily separated. The polyarylene sulfides produced by this process contain an ash in a content as high as 5,600 ppm. The polyarylene sulfides as having such a high ash content are inappropriate for uses as molding materials, films, filaments and, particulary, electronic parts. Furthermore, this process requires an additional dehydration operation because an aqueous solution of an alkali metal hydroxide is added after dehydration of an alkali metal hydrosulfide so that dehydration operation should be carried out in a two-step method. This is extremely laborious. It is further to be noted that this process should be improved because the alkali metal hydrosulfide is caused to decompose to a considerable extent.

As a process for removing a salt residue from polyarylene sulfide products, U.S. Pat. No. 4,071,509 proposes a process for recovering polyarylene sulfides with a low ash content, in which the polyarylene sulfide products are washed with an organic amide compound in the presence of an alkali metal salt. This process involves contacting the alkali metal salt with the resulting polyarylene sulfide after completion of polymerization, however, this process requires a complex purification operation.

In order to improve this process, U.S. Pat. No. 4,810,773 proposes a process in which an alkali metal halide is used in place of the alkali metal salt. It is to be noted, however, that effects are insufficient.

Furthermore, U.S. Pat. No. 4,038,263 discloses a process using a lithium halide as a catalyst for the reaction of an alkali metal sulfide with p-dichlorobenzene. This process can provide polyarylene sulfides with a high molecular weight yet in a yield as low as from about 70% to 85%. Thus demands have been made to further improvements in yields. This process also suffers the disadvantages that dehydration operation is difficult because the alkali metal sulfide is used and that handling is also difficult because the alkali metal sulfide is used in the form of a solid substance.

SUMMARY OF THE INVENTION

The present invention has the object to provide a novel process for the production of polyarylene sulfides of a higher molecular weight with a less salt content and a higher degree of whiteness, yielding them with higher efficiency and in higher yields, than conventional polyarylene sulfides as have been described hereinabove.

In order to achieve the above object, the present invention consists of a process for the production of polyarylene sulfides, comprising the step of polymerizing a dihalogen aromatic compound with an alkali hydrosulfide in the presence of a lithium halide in an organic polar solvent.

Alternatively, a process therefor comprises a polymerization of the dihalogen aromatic compound with the alkali metal hydrosulfide and an alkali metal hydroxide and/or an alkali metal carbonate in the presence of the lithium halide in the organic polar solvent.

A branching agent, preferably such as a halogen aromatic nitro compound, may be used.

DETAILED DESCRIPTION OF THE PREFERRED EMBODIMENTS

As have been described hereinabove, the process according to the present invention comprises a polymerization of the dihalogen aromatic compound with the alkali metal hydrosulfide.

The dihalogen aromatic compound to be used as a starting material of the process according thereto may comprise an aromatic compound with two halogen substituents on its ring moiety and may include, for example, a dihalobenzene such as o-dichlorobenzene, m-dichlorobenzene, p-dichlorobenzene, o-dibromobenzene, m-dibromobenzene, p-dibromobenzene, p-diiodobenzene, 1-chloro-4-bromobenzene and 1-chloro-4-iodobenzene; a substituted dihalobenzene such as 2,5-dichlorotoluene, 2,5-dichloro-p-xylene, 1-ethyl-2,5-dichlorobenzene, 1-ethyl-2,5-dibromobenzene, 1-ethyl-2-bromo-5-chlorobenzene, 1,2,3,5-tetramethyl-3,6-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-toluyl-2,5-dichlorobenzene, 1-p-toluyl-2,5-dibromobenzene, and 1-hexyl-2,5-dichlorobenzene; a dihalobiphenyl such as 4,4'-dichlorobiphenyl; a dihalobiphenyl alkane such as 2,2-di(p-chlorophenyl)propane; a dihalonaphthalene such as 1,4-dichloronaphthalene, 1,6-dichloronaphthalene, 2,6-dichloronaphthalene, 1,6-dibromonaphthalene and 2,6-dibromonaphthalene; a dihalogen substituted aromatic crboxylic acid such as 3,5-dichlorobenzoic acid; and a dihalodiphenyl derivative such as 4,4'-dichlorodiphenyl ether, 4,4'-dichlorodiphenyl ketone, 4,4'-dichlorodiphenyl sulfide and 4,4'-dichlorodiphenyl sulfoxide. A p-dihalobenzene such as p-dichlorobenzene is more preferred. The dihalogen aromatic compounds may be used singly or in combination with the other dihalogen aromatic compound or compounds. If the p-dihalobenzene is used in combination with the other dihalogen aromatic compounds, it is preferred that the p-dihalobenzene is used at the rate of 80 mol % or more.

The alkali metal hydrosulfide to be used for the present invention may include, for example, lithium hydrosulfide, sodium hydrosulfide, potassium hydrosulfide, rubidium hydrosulfide and cesium hydrosulfide. Preferred are lithium hydrosulfide and sodium hydrosulfide, and more preferred is sodium hydrosulfide. The alkali metal hydrosulfide may be used singly or in combination with the other hydrosulfide or hydrosulfides. Although the alkali metal hydrosulfide may be used in the form of an anhydride, hydrate, and an aqueous solution, it is desirable to carry out dehydration operation prior to polymerization to such an extent to which it causes no disadvantages when the alkali metal hydrosulfide is used in the form of hydrate or aqueous solution.

In accordance with the present invention, it is preferred to use the alkali metal hydrosulfide together with a base which may be inorganic or organic, if the base would be preferably an acid receptor that can efficiently neutralize hydrogen halide produced from a condensation of the alkali metal hydrosulfide with the dihalogen aromatic compound, and does not impair the object of the present invention. As the base may be usually used an alkali metal hydroxide and/or an alkali metal carbonate.

The alkali metal hydroxide to be used for the present invention may include, for example, magnesium hydroxide, calcium hydroxide, strontium hydroxide, barium hydroxide, sodium hydroxide, lithium hydroxide, rubidium hydroxide and cesium hydroxide. The alkali metal hydroxide may be used singly or in combinationa with the other hydroxide or hydroxides. Furthermore, a product containing an alkali metal hydroxide obtainable from a reaction of the alkali metal hydroxide with water may be used as it is. For the process according to the present invention, sodium hydroxide is preferred.

The alkali metal carbonate to be used therefor may include, for example, magnesium carbonate, calcium carbonate, strontium carbonate, barium carbonate, lithium carbonate, sodium carbonate, potassium carbonate, rubidium carbonate and cesium carbonate. The alkali metal carbonate may be used singly or in combination with the other carbonate or carbonates.

The bases such as the alkali metal hydroxides and carbonates may be in the form of an anhydride, hydrate, or an aqueous solution and may be preferably in the anhdrous form.

In accordance with the present invention, a branching agent may be added to the polymerization of the dihalogen aromatic compound with the alkali metal hydrosulfide or with the alkali metal hydrosufide and the alkali metal hydroxide and/or carbonate, in order to form branches on the polyarylene sulfides. The branching agent may be a polyhalogen aromatic compound or a halogen aromatic nitro compound.

The polyhalogen aromatic compound to be used as the branching agent may be a trihalogen aromatic compound which may include, for example, 1,2,4-trichlorobenzene, 1,3,5-trichlorobenzene and 1,4,6-trichloronaphthalene.

The halogen aromatic nitro compound to be used as another branching agent may be represented by following general formulas:

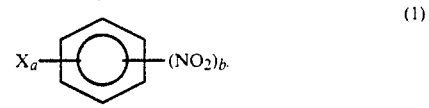

(wherein X is a halogen atom, a is 1 or 2, and b is an integer from 1 to
5, provided, however, that a+b is 4 or 5.);

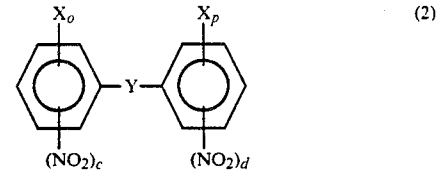

[wherein Y is a single bond (—), —O—, —S—, —SO—, —(CH$_2$)$_u$— (where u is an integer larger than 1), o and p are each 0, 1 or 2, and c and d are each 0 or an integer of 1 to 5, provided, however, that o+p is 1 or 2 that 1 < c+d ≦ 10+(o+o)]; and

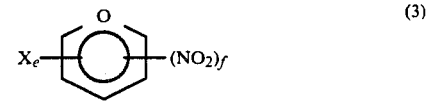

(wherein e is 1 or 2 and f is an integer of 1 to 4. provided, however, that e+f is 4 or 5.)

As the halogen aromatic nitro compound as represented by the formula (1) may be exemplified, for example, 2,4-dinitrochlorobenzene and 2,5-dichloronitrobenzene.

The halogen aromatic nitro compound as represented by the formula (2) may include, for example, 2-nitro-4,4'-dichlorodiphenyl ether and 3,3'-dinitro 4,4'-dichlorodiphenyl sulfone.

The halogen aromatic nitro compound as represented by the formula (3) may include, for example, 2,5-dichloro-3-nitropyridine and 2-chloro-3,5-dinitropyridine.

Among the mono- or di-halogen aromatic nitro compounds, 2,5-dichloronitrobenzene is preferred. The mono- or di-halogen aromatic nitro compound may be used singly or in combination with the other nitro compound or compounds. An alkyl derivative of the halogen aromatic nitro compounds represented by the above formulas may also be used as a mono- or di-halogen aromatic nitro compound.

As a branching component may be further used a halogen aromatic compound containing an active hydrogen atom such as 2,6-dichloroaniline and 2,5-dichloroaniline.

Furthermore, as desired, monohalogen aromatic compound or a compound containing an active hydrogen atom may be employed as a molecular weight modifier. It may include, for example, chlorobenzene, bromobenzene, α-chlorotoluene, thiophenol, phenol and aniline.

The polymerization of the dihalogen aromatic compound is caried out in the presence of the lithium halide in the organic polar solvent The lithium halide to be used in the process according to the present invention may include, for example, lithium fluoride, lithium chloride, lithium bromide, and lithium iodide. Particularly preferred is lithium chloride. It may be used singly or in combination with the other lithium halide or halides. It may be used in the form of an anhydride, a hydrate or an aqueous solution. If the hydrate or aqueous solution is used, it is necessary to carry out dehydration prior to polymerization.

The organic polar solvent to be used for the process may be an amine compound, a lactam compound, a urea compound, a cyclic organic phosphorous compound, and the like. More specifically, it may include, for example, a formamide such as N,N-dimethylrormamide; an amide such as N,N-dimethylacetamide, N,N-diethylacetamide, N,N-dipropylacetamide and N,N-dimethyloenzoic acid amide; a caprolactam such as caprolactam, N-methylcaprolactam, N-ethylcaprolactam, N-propylcaprolactam, N-isopropylcaprolactam, N-butylcaprolactam, N-isobutylcaprolactam and N-cyclohexylcaprolactam; apyrrolidone such as N-methyl-2-pyrrolidone, N-ethyl-2-pyrrolidone, N-propyl-2-pyrrolidone, N-butyl-2-pyrrolidone, N isopropyl-2-pyrrolidone, N-isobutyl-2-pyrrolidone, N-cyclohexyl-2-pyrrolidone, N-methyl-3-methyl-2-pyrrolidone and N-methy-3,4,5-trimethyl-2-pyrrolidone; a piperidone such as N-methyl-2piperidone, N-ethyl-2-piperidone, N-isopropyl-2-piperidone, N-methyl-6-methyl-2-piperidone and N-methyl-6-methyl-2piperidone; an oxohexamethylene imine such as N-methyl-2-oxohexamethylene imine and N-ethyl-2-oxohexamethylene imine, a phosphoric acid triamide such as hexamethyl phosphoric acid triamide and hexaethyl phosphoric acid triamide: a urea such as tetramethylurea, 1,3-dimethylethylene urea and 1,3-dimethylpropylene urea; an oxosulforane such as 1-methyl-1-oxosulforane, 1-ethyl-1-oxosulforane and 1-phenyl-1-oxosulforane; and an oxophosphane such as 1-methyl-1-oxophosphane, 1-propyl-1-oxophosphane and 1-phenyl-1-oxophosphane. Among those organic polar solvents, an N-alkylactam and an N-alkylpyrrolidone are preferred and the N-alkylpyrrolidone is more preferred. The solvent may be used singly or in combination with the other solvent and solvents.

The polymerization according to the present invention may be carried out in various manners and, in the process according to the present invention, the dihalogen aromatic compound and the alkali metal hydrosulfide may be added to the organic polar solvent in any order, for example, by adding a mixture of them to the solvent or by separately adding them to the solvent to thereby bring them into contact with each other in the solvent, whereby the dihalogen aromatic compound is polymerized with the alkali metal hydrosulfide yielding the polyarylene sulfides.

One embodiment of the polymerization according to the present invention involves polymerizing the dihalogen aromatic compound with the alkali metal hydrosulfide in the presence of the lithium halide in the organic solvent.

Another embodiment of the polymerization according to the present invention involves polymerizing the dihalogen aromatic compound with the alkali metal hydrosulfide and the alkali metal hydroxide and/or carbonate in the presence of the lithium halide in the organic polar solvent.

Other embodiment of polymerization according to the present invention involves using the branching agent in the manners of polymerization as have been described hereinabove.

In a manner in the another embodiment of the polymerization using the dihalogen aromatic compound, the alkali metal hydrosulfide, and the alkali metal hydroxide and/or carbonate, it is preferred that a mixture of the alkali metal hydrosulfide, the alkali metal hydroxide and/or carbonate, and the lithium halide in the organic polar solvent is first subjected to dehydration and the resulting dehydrated material is then brought into contact with the dihalogen aromatic compound. It is also possible to use only a portion of the amount of the lithium halide to be used in dehydration of the mixture and then to contact the resulting dehydrated substance with the dihalogen aromatic compound and the rest of the lithium halide.

It is further possible to first dehydrate a mixture of all of the components to be used in the reaction and then polymerize it.

In another manner in the other embodiment of the polymerization further using the branching agent, it is preferred that a mixture of the alkali metal hydroxide and the alkali metal hydroxide and/or carbonate in the organic polar solvent is first subjected to dehydration and the resulting dehydrated material is then contacted with the dihalogen aromatic compound and the branching agent. It is also possible to use only a portion of the amount of the lithium halide to be used in dehydration of the mixture and then to contact the resulting dehydrated substance with the dihalogen aromatic compound, the branching agent and the rest of the lithium halide.

It is further possible to first subject a mixture of the dihalogen aromatic compound, the branching agent, the alkali metal hydrosulfide, the alkali metal hydroxide and/or the lithium halide in the organic solvent to dehydration and then to polymerization.

The dehydration may be carried out by means of an azeotropic distillation in an inert gas such as nitrogen streams under conventional conditions which may be reduced or pressurized. It is preferred to carry out the dehydration in nitrogen streams at a temperature ranging from 120° C. to 200° C. under reduced pressures for 0.2 to 5 hours.

For the dehydration, the lithium halide may be admixed with the alkali metal hydrosulfide in a molar ratio of the former to the latter ranging generally from 0.3:1 to 2.0:1, preferably from 0.5:1 to 1.8:1. If this molar ratio is smaller than the lower limit, the resulting polyarylene sulfides cannot be provided with desired higher molecular weights and a salt content in the resulting polymer cannot be reduced. If the molar ratio exceeds the upper limit, the resulting polymer may be caused to precipitate at earlier stages during the polymerization, posing the difficulty in polymerization operation and providing the resulting polyarylene sulfides with no higher molecuar weights as desired. Furthermore, for the dehydration, the alkali metal hydrosulfide may be preferably admixed with the alkali metal hydroxide in a molar ratio of the latter to the former ranging generally from 0.8:1 to 1.5:1, preferably from 0.8:1 to 1.3:1. If the molar ratio of the alkali metal hydroxide to the alkali metal hydrosulfide is smaller than the lower limit, it sometimes may happen that the alkali metal hydroxide is decomposed in a too much amount. If the molar ratio exceeds the upper limit, the alkali metal hydroxide is admixed too much so that the effect cannot be expected for its large amount and rather deterioration of the organic polar solvent occurs too rapid.

The alkali metal carbonate may be used in a molar ratio of the alkali metal carbonate to the alkali metal hydrosulfide, which is the same as in the molar ratio of the alkali metal hydroxide to the alkali metal hydrosulfide.

When a mixture of the alkali metal hydroxide and carbonate is used, a molar ratio of a total amount of the mixture to the alkali metal hydrosulfide may be the same as the molar ratio of the alkali metal hydroxide to the alkali metal hydrosulfide.

For the polymerization, the dihalogen aromatic compound may be admixed with the alkali metal hydrosulfide in a molar ratio of the former to the latter ranging generally from 0.8:1 to 1.5:1, preferably from 0.9:1 to 1.3:1. As the rection of the dihalogen aromatic compound with the alkali metal hydrosulfide occurs in equimolar amounts, the polymerization is carried out within the range of the molar ratio as have been described hereinabove. If this molar ratio is smaller than the lower limit or it exceeds the upper limit, no industrially valuable polyarylene sulfides can be produced. A thiophenol is also produced as a by-product if the molar ratio is lower than 0.8:1.

The dihalogen aromatic compound may be admixed with the branching agent in a molar ratio of the latter to the former ranging usually from 0.0001:1 to 0.05:1, preferably from 0.001:1 to 0.03:1. If the branching agent is used in the molar ratio smaller than the lower limit, no polyarylene sulfides with desired high molecular weights can be given. If the molar ratio is larger than the upper limit, gellation is caused to occur during polymerization and no moldable polyarylene sulfides can be produced.

An amount of the organic polar solvent may be such that the reaction proceeds smoothly and may be in the range usually from 180 to 1,000 grams per mole of the alkali metal hydrosulfide.

The polymerization may be carried out at temperatures ranging from 180° C. to 330° C., preferably from 210° C. to 290° C. If the reaction temperature is too low, a reaction velocity is not sufficiently fast to allow polymerization to proceed. On the other hand, if the reaction temperature is too high, side reactions are caused to occur, the polymer once produced may be caused to decompose, and deterioration of the organic solvent may occur, leading to a decrease in yields of the polyarylene sulfides.

There is no limits to the reaction pressure and it may range usually from a self-pressure of the polymerization reaction system such as the solvent and the like to 10 kg/cm$^2$ (absolute atmosphere).

The polymerization may be carried out for a reaction time usually within 20 hours, preferably from 0.1 hour to 8 hours, in the presence of an inert gas such as nitrogen, carbon dioxide and steam.

After completion of the polymerization, the resulting polyarylene sulfides may be separated directly from the reaction mixture by conventional separation method such as filtration or centrifugation or they may be separated from the reaction mixture, for example, after a dilution with water or an addition of an acid.

Following the filtration step, any inorganic component adhering to the resulting polymer, such as the alkali metal hydrosulfide, hydroxide and/or carbonate is then removed by washing with water. On top of the washing step or subsequent thereto, the washing with another washing agent such as N-methylpyrrolidone, acetone or methanol or extraction therewith can be carried out. The polymer may also be recovered by removing the solvent from a reactor followed by the washing in substantially the same manner as above.

It is found that the polyarylene sulfides produced and recovered in the manner as have been described hereinabove are considerably lower in a salt content than the polyarylene sulfides obtainable by conventional methods using the alkali metal sulfides as a sulfur source, so that they are high in a resistance to moisture and electrical insulation and may be appropriately used in the electrical and electronic field after molding and processing particularly without desalting processing. If required, they may be used after being washed in the manner as have been described hereinabove and subjected to various desalting processings to reduce a salt concentration of, for example, a salt in the resin to a lesser content.

When the polyarylene sulfides produced by the process according to the present invention may be molded into various products, there may be added thereto one or more of other polymers, a pigment and a filler, such as graphite, carbon black, talc, calcium carbonate, silica, mica, metal powders, glass powders, quartz powders or glass fibers, or an additive to be conventionally used with polyarylene sulfides such as a stabilizer or a mold lubricant.

The polyarylene sulfides are produced by the process according to the present invention with a high yield as a resin of high molecular weight which has a higher degree of whiteness, a high purity, and a smaller melt flow. They may accordingly be used as molded products of various forms and as a matrix resin of composing agents and may be formed various molded products, films, and fibers and used as electrical and electronic parts as well as mechanical parts. In these respects, the polyarylene sulfides to be produced by the process according to the present invention are excellent engineering plastics.

The present invention will be described by way of examples.

EXAMPLE 1

A mixture of 42.8 g (0.543 moles) of sodium hydrosulfide (content: 71%; water, 29%), 21.7 g (0.543 moles) of sodium hydroxide in a pellet form, 23.0 g (0.543 moles) of lithium chloride, and 297 ml of N-methyl-2-pyrrolidone was charged into a one-liter autoclave which, in turn, was replenished with nitrogen.

The content in the autoclave was raised under nitrogen streams to 120° C. and kept at that temperature for 1 hour, followed by dehydration by means of distillation at 150° C. over a period of 1 hour, thereby removing 105 ml of a mixture of N-methyl-2-pyrrolidone and water.

The inner temperature of the autoclave was dropped to 100° C. and then a solution of 79.8 g (0.543 moles) of p-dichlorobenzene in 100 ml of N-methylpyrrolidone was added. Thereafter, the autoclave was tightly closed and raised to 260° C. to carry out polymerization for 3 hours at this temperature.

After completion of polymerization, the inner temperature of the autoclave was dropped to a temperature close to room temperature and then opened. The reaction product in a slurry form was collected and filtered to separate polymers in a granular form which, in turn, were washed with acetone and dried in vacuum at 100° C., yielding 53.0 g of a polyphenylene sulfide (yield, 90% based on p-dichlorobenzene).

It is found that the resulting product is polyphenylene sulfide having a molecular weight expressed by a inherent viscosity $[\eta_{inh}]$ of 0.30 as a result of measurement using $\alpha$-chloronaphthalene as a solvent in a concentration of 0.4 g/dl at a temperature of 206° C. and containing 80 ppm of sodium ion in this product as a result of atomic absorption photometry.

EXAMPLE 2

The procedures were followed in the same manner as in Example 1 with the exception that the lithium chloride was added subsequent to dehydration instead of prior to dehydration, yielding 52.8 g (yield: 90%) of polyphenylene sulfide having a inherent viscosity $[\eta_{inh}]$ of 0.28 and containing 88 ppm of sodium ions as a result of measurement made in the same manner as in Example 1.

COMPARATIVE EXAMPLE 1

Polyphenylene sulfide was prepared in substantially the same manner as in Example 1 with the exception that no lithium chloride was used.

This Comparative Example yielded polyphenylene sulfide in a yield of 57.3 g (98%) having a inherent viscosity $[\eta_{inh}]$ of 0.17 and containing 2,980 ppm of sodium ions as a result of measurement made in the same manner as in Example 1.

EXAMPLE 3

The procedures were followed in the same manner as in Example 1 with the exception that 57.6 g (0.543 moles) of sodium carbonate was used in place of the sodium hydroxide in the pellet form.

As a result, polyphenylene sulfide was produced in a yield of 34.0 g (58%), which is found to have a inherent viscosity $[\eta_{inh}]$ of 0.11 and containing 180 ppm of sodium ions as a result of measurement made in the same manner as in Example 1.

COMPARATIVE EXAMPLE 2

Polyphenylene sulfide was produced in substantially the same manner as in Example 3 with the exception that no lithium chloride was used.

This Comparative Example yielded polyphenylene sulfide in a yield of 11.5 g (20%) having a inherent viscosity $[\eta_{inh}]$ of 0.03 and containing 2,980 ppm of sodium ions as a result of measurement made in the same manner as in Example 1.

This Comparative Example corresponds to examples of U.S. Pat. No. 4,876,591.

EXAMPLE 4

The procedures were followed in substantially the same manner as in Example 1 with the exception that the amount of p-dichlorobenzene was changed from 79.8 g (0.543 moles) to 7.9 g (0.462 moles) and no sodium hydroxide in the form of pellet was used.

As a result, polyphenylene sulfide was produced in a yield of 13.8 g (27%). which is found to have a inherent viscosity $[\eta_{inh}]$ of 0.06 and containing 500 ppm of sodium ions as a result of measurement made in the same manner as in Example 1.

This polyphenylene sulfide is found to have a molecular weight higher than any one disclosed in U.S. Pat. No. 3,876,591.

EXAMPLE 5

The procedures were followed in substantially the same manner as in Example 1 with the exception that 0.30 g (0.0016 mole) of trichlorobenzene was added.

As a result, polyphenylene sulfide was produced in a yield of 53.8 g (92%). which is found to have a inherent viscosity $[\eta_{inh}]$ of 0.37 and containing 95 ppm of sodium ions as a result of measurement made in the same manner as in Example 1.

EXAMPLE 6

A mixture of 42.8 g (0.543 moles) of sodium hydrosulfide (content: 71%; water, 29%), 21.7 g (0.543 moles) of sodium hydroxide in a pellet form, 23.0 g (0.543 moles) of lithium chloride, and 297 ml of N-methyl-2-pyrrolidone was charged into a one-liter autoclave which, in turn, was replenished with nitrogen.

The content in the autoclave was raised under nitrogen streams to 120° C. and kept at that temperature for 1 hour, followed by dehydration by means of distillation at 150° C. over a period of 1 hour, thereby removing 105 ml of a mixture of N-methyl-2-pyrrolidone and water.

The inner temperature of the autoclave was dropped to 100° C. and then a solution of 79.5 g (0.54 moles) of p-dichlorobenzene and 0.31 g (0.0016 moles) of 2,5-dichloronitrobenzene in 100 ml of N-methylpyrrolidone was added. Thereafter, the autoclave was tightly closed and raised to 260° C. to carry out polymerization for 3 hours at this temperature.

After completion of polymerization, the inner temperature of the autoclave was dropped to a temperature close to room temperature and then opened. The reaction product in a slurry form was collected and filtered to separate polymers in granular shapes which, in turn, were washed with acetone and dried in vacuum at 100° C., yielding 54.5 g of a polyarylene sulfide (yield, 93.0% based on p-dichlorobenzene).

It is found that the resulting product is polyphenylene sulfide having a molecular weight expressed by a inherent viscosity [$\eta_{inh}$] of 0.30 and containing 81 ppm of sodium ions, as a result of measurement as made in the same manner as in Example 1.

EXAMPLE 7

The procedures were followed in substantially the same manner as in Example 6 with the exception that dehydration was carried out by changing the amount of lithium chloride from 23.0 g to 12.0 g and 11.02 g of lithium chloride was charged prior to p-dichlorobenzene.

As a result, polyphenylene sulfide was produced in a yield of 53.9 g (92%), which is found to have a inherent viscosity [$\eta_{inh}$] of 0.35 and containing 88 ppm of sodium ions as a result of measurement made in the same manner as in Example 1.

COMPARATIVE EXAMPLE 3

The procedures were followed in substantially the same manner as in Example 6 with the exception that dehydration was carried out by taking advantage of 91.29 g (0.543 moles) of sodium sulfide pentahydrate, 23.2 g (0.543 moles) of lithium chloride, and 297 ml of N-methylpyrrolidone, thus removing 145 ml of the mixture of N-methylpyrrolidone and water.

Thereafter, the content of the autoclave was dropped to 100° C., 79.8 g (0.543 moles) of p-dichlorobenzene dissolved in 103 ml of N-methylpyrrolidone was used for reaction in the same manner as in Example 6.

As a result, polyphenylene sulfide was produced in a yield of 51.0 g (87%), which is found to have a inherent viscosity [$\eta_{inh}$] of 0.28 and containing 105 ppm of sodium ions as a result of measurement made in the same manner as in Example 1.

COMPARATIVE EXAMPLE 4

Polyphenylene sulfide was produced in substantially the same manner as in Comparative Example 3 with the exception that, in place of 79.8 g of p-dichlorobenzene, 79.5 g (0.541 moles) of p-dichlorobenzene and 0.313 g (0.0016 moles) of dichloronitrobenzene were used.

This Comparative Example yielded polyphenylene sulfide in a yield of 49.3 g (84%) having a inherent viscosity [$\eta_{inh}$] of 0.32 and containing 220 ppm of sodium ions as a result of measurement made in the same manner as in Example 1.

COMPARATIVE EXAMPLE 5

Polyphenylene sulfide was produced in substantially the same manner as in Example 6 with the exception that no lithium chloride was used.

This Comparative Example yielded polyphenylene sulfide in a yield of 57.3 g (98%) having a inherent viscosity [$\eta_{inh}$] of 0.22 and containing 3,150 ppm of sodium ions as a result of measurement made in the same manner as in Example 1.

EXAMPLE 8

The procedures were followed in substantially the same manner as in Example 6 with the exception that 67.8 g (0.461 moles) of p-dichlorobenzene and 0.267 g (0.0014 moles) of 2,5-dichloronitrobenzene were used and no sodium hydroxide in the pellet form was used.

As a result, polyphenylene sulfide was produced in a yield of 13.6 g (27%), which is found to have a inherent viscosity [$\eta_{inh}$] of 0.06 and containing 800 ppm of sodium ions as a result of measurement made in the same manner as in Example 1.

It is further found that this polyphenylene sulfide has a molecular weight larger than any one disclosed in U.S. Pat. Nos. 3,869,433 and 3,876,591.

EXAMPLE 9

The procedures were followed in substantially the same manner as in Example 6 with the exception that 69.18 g (0.471 moles) of p-dichlorobenzene and 0.27 g (0.0014 moles) of 2,5-dichloronitrobenzene were used and 28.8 g of sodium carbonate in place of 21.7 g of sodium hydroxide in the pellet form was used.

As a result, polyphenylene sulfide was produced in a yield of 27.1 g (53%), which is found to have a inherent viscosity [$\eta_{inh}$] of 0.09 and containing 1,100 ppm of sodium ions as a result of measurement made in the same manner as in Example 1.

It is further found that this polyphenylene sulfide has characteristics superior to any one disclosed in U.S. Pat. No. 3,869,433.

EXAMPLE 10

This example is to determine an amount of sodium hydrosulfide decomposed.

An autoclave was charged with a mixture of sodium hydroxide in an amount as shown in Table below, 42.83 g (0.543 moles) of sodium hydrosulfide, 23.2 g (0.543 moles) of lithium chloride in 297 ml of N-methylpyrrolidone and the mixture was distilled in the same manner as in Example 1.

An amount of sodium hydrosulfide decomposed was determined by measuring an amount of hydrogen sulfide produced during distillation. Test results are shown in Table below.

Hydrogen sulfide was quantitated by means of iodometry by trapping a formed gas with an alkali.

TABLE

| Amount of NaOH Added (g) | Amount of NaSH decomposed (g) |
| --- | --- |
| 0 | 14.9 |
| 0.5 | 9.6 |
| 0.65 | 5.1 |

As is apparent from the results of Table above, it is found that an addition of sodium hydroxide prior to dehydration reduces an amount of the sodium hydrosulfide to be decomposed and that it is advantageous for polymerization.

As have been described hereinabove, the process according to the present invention permits a production of the polyarylene sulfides in a lesser salt amount with a high yield than those polyarylene sulfides produced by conventional pos-processing.

It is further to be noted that the present invention present the advantages that a sulfur source can be used in the form of an aqueous solution so that the handling of the starting materials is simplified and dehydration can be carried out easily from the aqueous solution, thus simplifying steps of preparing while preventing a transformation as a result of heating during dehydration.

Thus the process according to the present invention can provide the polyarylene sulfides with a less salt content and a higher degree of whiteness.

Although the present invention has been described by way of examples in the manner as have been described hereinabove, it is to be understood that the present invention may be embodied in the specific forms without departing from the spirit and scope thereof. The present embodiments as have been described hereinabove are therefore to be considered in all respects as illustrative and not restrictive. the scope of the invention being indicated by the appended claims, and all the changes and modifications which come within the meaning and range of equivalency of the claims are therefore to be encompassed within the spirit and scope of the invention.

What is claimed is:

1. A process for preparing a polyarylene sulfide consisting essentially of polymerizing a dihalogen aromatic compound with an alkali metal hydrosulfide in the presence of a lithium halide and a base, selected from a group consisting of an alkali metal hydroxide and an alkali metal carbonates, in an organic polar solvent.

2. A process as claimed in claim 1, comprising polymerizing in the further presence of a compound selected from the group consisting of a trihalogen aromatic compound, a halogen aromatic nitro compound, an alkali metal derivative of said halogen aromatic nitro compound, and a halogen aromatic compound containing an active hydrogen atom.

3. A process as claimed in any one of claims 1 and 2, comprising polymerizing in the further presence of a molecular weight modifier selected from the group consisting of a monohalogen aromatic compound and a compound containing an active hydrogen atom.

4. A process as claimed in any one of claims 1, 2 and 3 wherein the molar ratio of said dihalogen aromatic compound to said alkali metal hydrosulfide ranges from 0.8:1 to 1.5:1.

5. A process as claimed in any one of claims 1, 2 and 3 wherein the molar ratio of said lithium halide to said alkali metal hydrosulfide ranges from 0.3:1 to 2.0:1.

6. A process as claimed in any one of claims 1, 2 and 3, wherein the molar ratio of said alkali metal hydroxide or alkali metal carbonate to said alkali metal hydrosulfide ranges from 0.8:1 to 1.5:1.

* * * * *